(12) United States Patent
Pardoe

(10) Patent No.: US 10,139,884 B2
(45) Date of Patent: Nov. 27, 2018

(54) POWER LOSS PROTECTION FOR SOLID STATE DRIVES

(71) Applicant: Toshiba Memory Corporation, Minato-ku, Tokyo (JP)

(72) Inventor: Stephen K. Pardoe, Swindon (GB)

(73) Assignee: Toshiba Memory Corporation, Tokyo (JP)

( * ) Notice: Subject to any disclaimer, the term of this patent is extended or adjusted under 35 U.S.C. 154(b) by 378 days.

(21) Appl. No.: 14/757,469

(22) Filed: Dec. 23, 2015

(65) Prior Publication Data

US 2017/0185335 A1   Jun. 29, 2017

(51) Int. Cl.
   *G06F 1/30*   (2006.01)
   *G06F 1/32*   (2006.01)
   *G06F 1/28*   (2006.01)

(52) U.S. Cl.
   CPC ............. *G06F 1/30* (2013.01); *G06F 1/28* (2013.01); *G06F 1/3206* (2013.01); *G06F 1/3268* (2013.01); *G06F 1/3296* (2013.01); *Y02D 10/154* (2018.01)

(58) Field of Classification Search
   None
   See application file for complete search history.

(56) References Cited

U.S. PATENT DOCUMENTS

| | | | |
|---|---|---|---|
| 9,143,005 B1* | 9/2015 | Laird | H02J 9/00 |
| 2010/0011159 A1* | 1/2010 | Sutardja | G06F 12/023 |
| | | | 711/103 |
| 2013/0147526 A1* | 6/2013 | Kim | H03K 21/00 |
| | | | 327/115 |
| 2014/0258755 A1* | 9/2014 | Stenfort | G06F 1/30 |
| | | | 713/323 |
| 2015/0253831 A1* | 9/2015 | Liu | G06F 1/30 |
| | | | 713/320 |
| 2017/0060436 A1* | 3/2017 | Trika | G06F 3/0611 |
| 2017/0060668 A1* | 3/2017 | Farhan | G06F 11/0793 |
| 2017/0068488 A1* | 3/2017 | Shibatani | G06F 12/0246 |
| 2017/0330603 A1* | 11/2017 | Zhou | G11C 16/225 |

* cited by examiner

*Primary Examiner* — Nitin Patel
(74) *Attorney, Agent, or Firm* — White & Case LLP

(57) ABSTRACT

A solid state drive (SSD) with power loss protection (PLP) and a method of PLP for an SSD is disclosed. In one embodiment, the SSD includes an SSD controller with one or more memory device controllers, a volatile memory in communication with the SSD controller, a non-volatile memory in communication with the SSD controller, and a power circuit in communication with the SSD controller and configured to supply power to the non-volatile memory during a normal operation of the SSD. The non-volatile memory includes a plurality of non-volatile memory devices arranged in a plurality of partitions that are controlled by the one or more memory device controllers. In the event of a power loss or failure, the power circuit supplies power to active partitions, which correspond to less than all of the plurality of partitions of the plurality of non-volatile memory devices.

32 Claims, 7 Drawing Sheets

POWER LOSS PROTECTION FOR SOLID STATE DRIVES

FIELD OF THE INVENTION

This invention generally relates to power loss protection (PLP) for solid state drives (SSDs).

BACKGROUND OF THE INVENTION

As the solid state drive (SSD) plays an increasingly important role in computer and enterprise storage, there is a correlated increase in importance and reliance on the use of backup power sources, such as supercapacitors, to help prevent data loss in the SSD from occurring due to power outage or power loss. This feature is generally referred to as power loss protection (PLP). When a power outage or power loss occurs for a host device, such as a computer, with an SSD, the energy stored by the supercapacitor provides backup power to ensure that all pending commands are successfully completed by the SSD, all critical data is saved, and the SSD can shut down properly.

In normal operation, the energy consumed by the non-volatile memory array (NVMA) in an SSD represents a large portion of the total energy consumed by the SSD. During a power outage or power loss, much of the energy that is drawn from the supercapacitor is used to power the entire NVMA. The need to maintain power for the entire NVMA through the duration of processing all of the pending commands by the SSD during the power outage or power loss situation stems from the general design and coding considerations for the SSD.

There is, therefore, an unmet demand for SSDs with PLP that makes more efficient use of the energy provided by the backup power source during a power outage or power loss situation.

BRIEF DESCRIPTION OF THE INVENTION

In one embodiment, a solid state drive (SSD) with power loss protection (PLP) includes an SSD controller with one or more memory device controllers, a volatile memory in communication with the SSD controller, a non-volatile memory in communication with the SSD controller, and a power circuit in communication with the SSD controller and configured to supply power to the non-volatile memory during a normal operation of the SSD. The non-volatile memory includes a plurality of non-volatile memory devices arranged in a plurality of partitions that are controlled by the one or more memory device controllers. In the event of a power loss or failure, the power circuit supplies power to active partitions, which correspond to less than all of the plurality of partitions of the plurality of non-volatile memory devices.

In one embodiment, the non-volatile memory devices are arranged in an array with a plurality of channels, with each of the channels including one or more of the non-volatile memory devices. In another embodiment, each of the one or more memory device controllers are configured to control a corresponding one or more channels of the array. In one embodiment, the non-volatile memory devices comprise NAND flash memory. In one embodiment, the volatile memory comprises DRAM.

In one embodiment, the power circuit includes a plurality of voltage regulators connected to the plurality of partitions, each of the plurality of voltage regulators being configured to supply power to a corresponding one or more partitions of the plurality of partitions. The power circuit further includes a switch connected to the plurality of voltage regulators that is configured to supply power to each of the plurality of voltage regulators from a first power source during normal operation, and from a second power source in the event of the power loss or failure. In one embodiment, the first power source comprises a host device. In one embodiment, the second power source comprises a capacitor or a battery.

In one embodiment, the power circuit transmits a first signal to the SSD controller in the event of the power loss or failure, and deactivates one or more voltage regulators of the plurality of voltage regulators. In another embodiment, the power circuit is configured to deactivate one or more voltage regulators in response to a second signal from the SSD controller. In one embodiment, the SSD controller is configured to deactivate the one or more memory device controllers controlling certain of the plurality of non-volatile memory devices that are not supplied power by the power circuit in the event of power loss or failure.

In one embodiment, the SSD controller is configured to identify critical information from the volatile memory in the event of the power loss or failure. In one embodiment, the SSD controller is configured to cause the transfer of the critical information to the active partitions in the event of the power loss or failure. In one embodiment, the critical information includes a logical to physical address update log. In another embodiment, the critical information includes acknowledged write commands. In other embodiments, the SSD controller may also transfer non-critical information to the active partitions in the event of the power loss or failure. The non-critical information may include unacknowledged write commands and read commands.

In one embodiment, a method of PLP for an SSD includes supplying power to a non-volatile memory during a normal operation of the SSD, the non-volatile memory including a plurality of non-volatile memory devices arranged in a plurality of partitions. The non-volatile memory devices are controlled by one or more memory controllers of an SSD controller. The method further includes supplying power to active partitions in the event of a power loss or failure of the SSD. The active partitions correspond to less than all of the plurality of partitions of the plurality of non-volatile memory devices. In one embodiment, the non-volatile memory devices are arranged in an array comprising a plurality of channels, with each of the channels including one or more of the non-volatile memory devices. In one embodiment, each of the one or more memory device controllers controls a corresponding one or more channels of the array. In one embodiment, the non-volatile memory devices comprise NAND flash memory.

In one embodiment, the method further includes deactivating the one or more memory device controllers controlling certain of the plurality of non-volatile memory devices that are not supplied power in the event of the power loss or failure. In one embodiment, a power circuit supplies power to the non-volatile memory. The power circuit includes a plurality of voltage regulators connected to the plurality of partitions of the plurality of devices, each of the plurality of voltage regulators supplying power to a corresponding one or more partitions of the plurality of partitions. The power circuit further includes a switch connected to the plurality of voltage regulators and supplying power to each of the plurality of voltage regulators from a first power source during normal operation, and from a second power source in the event of the power loss or failure. In one embodiment, the first power source comprises a host device. In one embodiment, the second power source comprises a capacitor or a battery.

In one embodiment, the method further includes transmitting a first signal from the power circuit to the SSD controller in the event of the power loss or failure, and deactivating one or more voltage regulators of the plurality of voltage regulators in the event of the power loss or failure. In one embodiment, the method further includes transmitting a second signal from the SSD controller to the power circuit, and deactivating one or more voltage regulators of the plurality of voltage regulators in response to the second signal.

In one embodiment, the method further includes identifying critical information in a volatile memory in the event of the power loss or failure. In one embodiment, the volatile memory comprises DRAM. In one embodiment, the method further includes transferring the critical information to the active partitions in the event of the power loss or failure. In one embodiment, the critical information comprises a logical to physical address update log. In one embodiment, the critical information comprises acknowledged write commands. In other embodiments, the method further includes transferring non-critical information to the active partitions in the event of the power loss or failure. The non-critical information may include unacknowledged write commands and read commands.

DETAILED DESCRIPTION OF THE INVENTION

SSDs are designed and coded with a focus on performing normal operations using the entire NVMA, which provides high performance and data integrity through the use of parallelism via multiple parallel channels of memory access and multiple non-volatile memory chips on each channel of the NVMA. The design and coding of an SSD is also tailored to alleviate the technical limitations in the use of NAND flash memory in the NVMA.

NAND flash memory devices have a limited number of program/erase cycles, suffer from data degradation over time, need to program (or write) data in units of pages but erase data in much larger units of blocks, and need to erase data before a write as NAND flash memory can only write to "erased" memory cells and cannot directly write over a previously written memory cell (unlike other types of memory technology). As a result, many functions in the SSD may not be strictly necessary in a power loss situation.

Minimizing the functions performed reduces the energy draw from the supercapacitor or backup power source after a power outage or power loss situation occurs. Consequently, a smaller supercapacitor or other backup power source can be used to power the SSD for PLP during a power outage or power loss situation. Using a smaller supercapacitor or backup power source results in reduced cost for both the type of supercapacitor or other backup power source required for the SSD, and reduces the corresponding operational complexities that would otherwise be encountered by using a larger supercapacitor or backup power source than is absolutely necessary.

Various embodiments of implementing more efficient PLP for SSDs that reduces the amount of energy draw from a backup power source during a power outage or power loss situation will now be described with respect to FIGS. 1-7, below.

Figure 1:
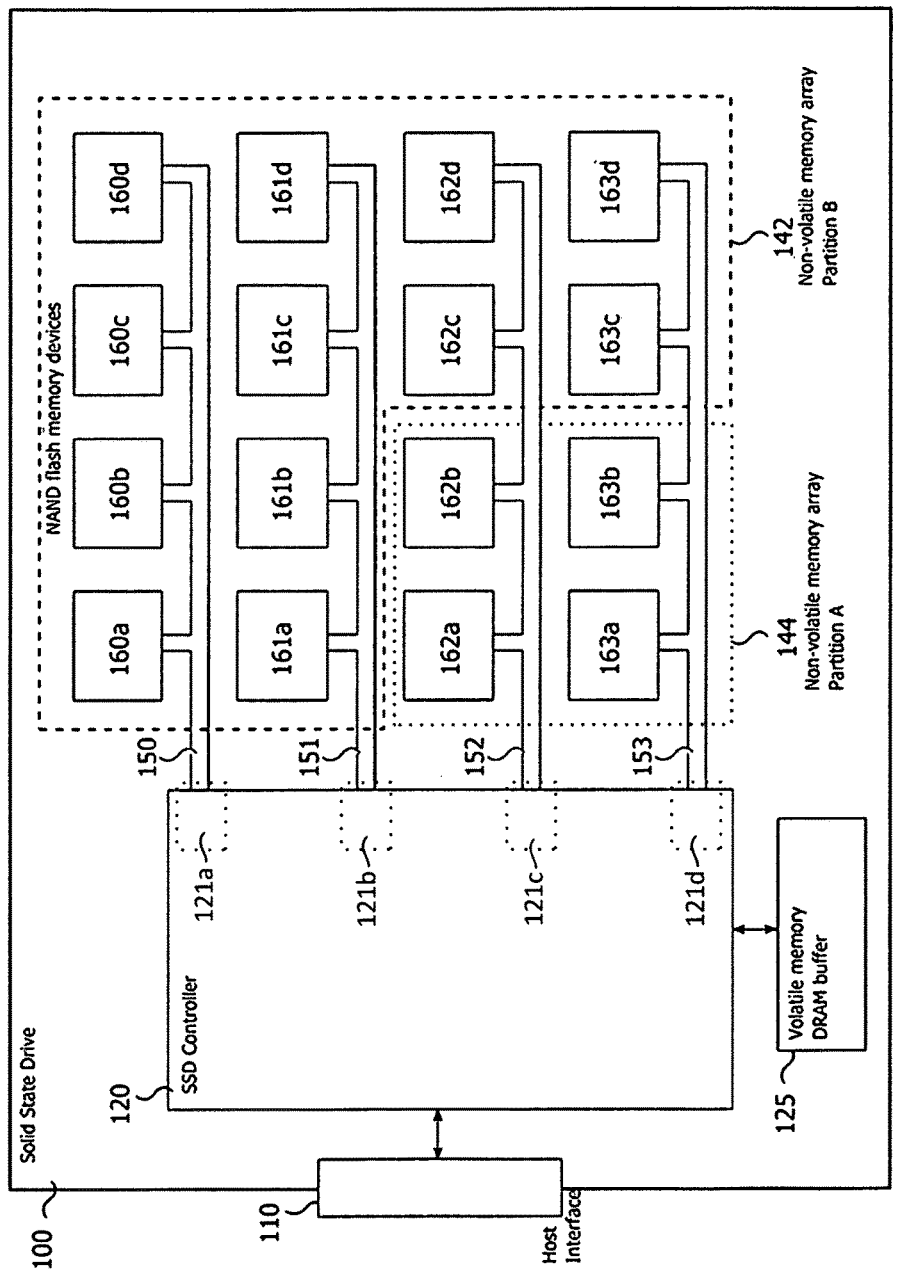
FIG. 1 is a block diagram of the structure of an SSD, according to one embodiment of the invention.

FIG. 1 shows a block diagram of the structure of an SSD 100, according to one embodiment of the invention. In FIG. 1, an SSD controller 120 is in direct communication with a host device (not shown) through a host interface 110. The host device may comprise any suitable device, such as a computer. The SSD 100 contains both a volatile memory, typically as a volatile memory DRAM buffer 125, and a NVMA comprising non-volatile memory devices 160a-d, 161a-d, 162a-d, and 163a-d. In one embodiment, the non-volatile memory devices 160a-d, 161a-d, 162a-d, and 163a-d comprise NAND flash memory. The NVMA is partitioned such that there is a dedicated partition, partition A 144, with the remainder of the devices in a separate partition, partition B 142. A partition refers to a physical arrangement of non-volatile memory devices 160a-d, 161a-d, 162a-d, and 163a-d.

The SSD controller 120 accesses the non-volatile memory devices 160a-d, 161a-d, 162a-d, and 163a-d of the NVMA via parallel channels 150-153. In FIG. 1, the NVMA is shown to have 4 parallel channels. In other embodiments, the NVMA may have 8, 16, or even more channels depending on the desired storage size of the SSD 100 and the capacity of the individual non-volatile memory devices 160a-d, 161a-d, 162a-d, and 163a-d. Each channel 150-153 is controlled independently by a channel controller (also known as memory device controllers) 121a-d in the SSD controller 120. Each channel controller 121a-d deals with a subset of the non-volatile memory devices in the NVMA. Namely, channel controller 121a corresponding to channel 150 deals with non-volatile memory devices 160a-d; channel controller 121b corresponding to channel 151 deals with non-volatile memory devices 161a-d; channel controller 121c corresponding to channel 152 deals with non-volatile memory devices 162a-d; and channel controller 121d corresponding to channel 153 deals with non-volatile memory devices 163a-d.

Figure 2:
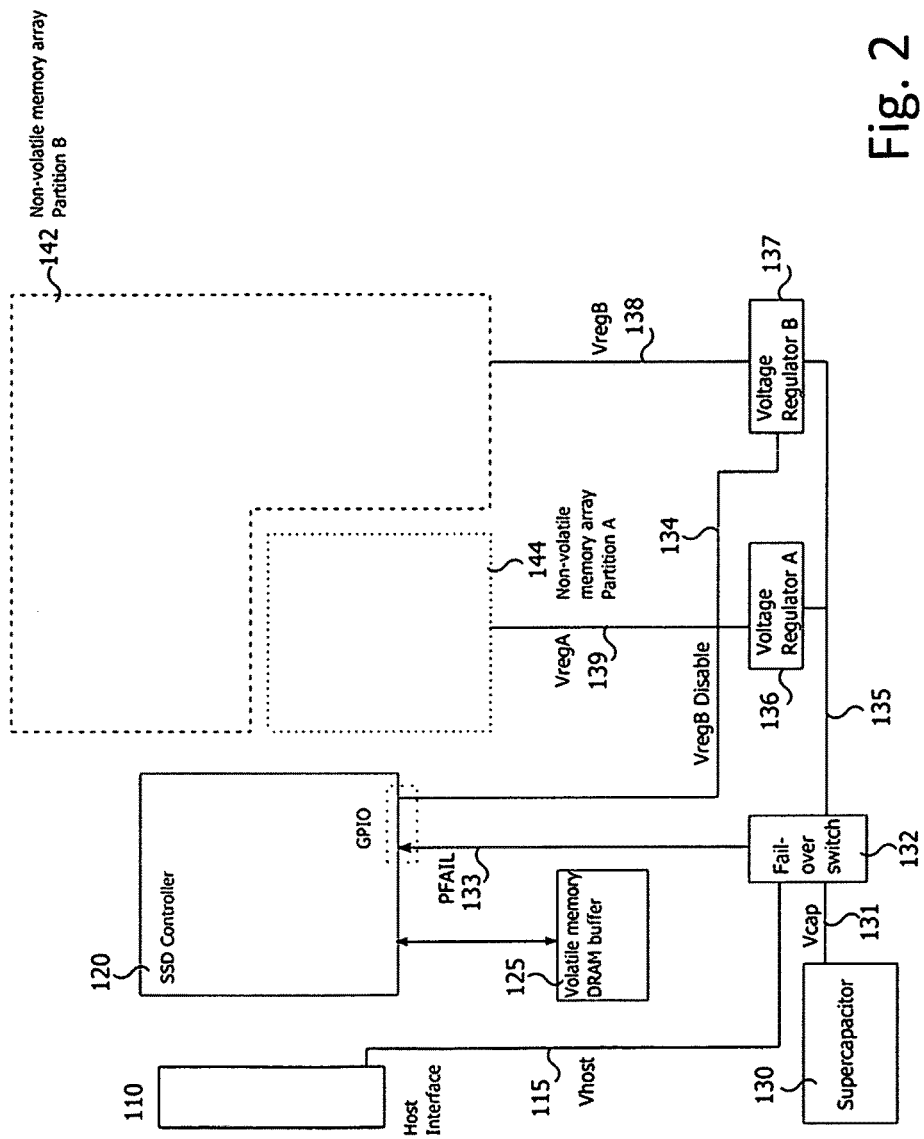
FIG. 2 is a block diagram of the circuitry for PLP for use in an SSD, according to one embodiment of the invention.

FIG. 2 shows a block diagram of the circuitry for PLP for use in an SSD, according to one embodiment of the invention. In FIG. 2, partition A 144 of the NVMA is provided with a regulated supply voltage VregA 139 by voltage regulator A 136. Partition B of the NVMA is provided with a separate regulated supply voltage VregB 138 by voltage regulator B 137, which may be turned on or off using a control signal VregB disable 134 which is supplied from a general purpose input/output (GPIO) pin from the SSD controller 120. By using the control signal VregB disable 134, the SSD controller 120 can turn the power off to partition B 142 while power is maintained to partition A 144.

Both voltage regulator A 136 and voltage regulator B 137 receive a voltage supply 135 from a failover switch 132. The failover switch 132 in turn receives its power either from the host interface 110 as voltage Vhost 115, or from a supercapacitor 130 (or similar backup power supply such as a battery) as voltage supply Vcap 131. During normal operation of the SSD, the failover switch 132 receives its power from the host interface 110 as Vhost 115 and passes the power received from the host interface 110 to the voltage supply 135. In turn, voltage supply 135 is supplied to partition A 144 via voltage regulator A 136, and in parallel, voltage supply 135 is supplied to partition B 142 via voltage regulator B 137. The SSD controller 120 and volatile memory DRAM buffer 125 may also receive power, either from voltage regulator A or an additional voltage regulator (not shown) which may also receive power from the failover switch 132.

In the event of a power failure to the host, the voltage Vhost 115 will begin to fail, dropping in voltage supplied to the failover switch 132, and the failover switch 132 will detect this drop and switch the input supply to voltage Vcap 131, from Vhost 115, to supply voltage supply 135. At the same time, a power fail signal PFAIL 133 will be sent to the SSD controller 120 via a GPIO input pin. The switchover from Vhost 115 to Vcap 131 happens within a few milliseconds, such that there is minimal perceptible change in the voltage supply 135 and voltage regulators A and B, 136 and 137, continue to operate normally, as well as the voltage supplies (not shown) to the SSD controller 120 and volatile memory DRAM buffer 125.

Thus, the SSD controller 120, volatile memory DRAM buffer 125 and the NVMA (comprising partition A 144 and partition B 142) continue to operate normally during and after a power failure event, and in particular, the SSD controller 120 remains able to access the entire NVMA (both partition A 144 and partition B 142). However, the power arrangement as shown in FIG. 2 enables the SSD controller 120 to assert the signal VregB disable 134 and thereby turn voltage regulator B 137 off such that the voltage supply VregB 138 is switched off so that power supply to partition B 142 is also switched off, while power remains supplied to partition A 144 via voltage regulator A 136. In another embodiment, voltage regulator B 137 may reduce the amount of power supplied to partition B 142 to a minimum threshold level, such as a low-power state of the non-volatile memory device where the non-volatile memory devices are powered, but may not be accessed by the SSD controller 120.

This enables the SSD controller 120 to still save critical information from volatile memory DRAM buffer 125 to partition A 144 of the NVMA, while reducing the power consumed by partition B 142 of the NVMA, either by reducing the power supplied to partition B or switching off the power supplied to partition B entirely. Since the amount of critical information in volatile memory DRAM buffer 125 is small in comparison to the size of the entire NVMA, partition A 144 need only be a small fraction of the NVMA, with partition B 142 representing the much larger fraction. In one embodiment, partition A 144 comprises a single non-volatile memory device. In this embodiment, only a single channel controller of the SSD controller 120 capable of accessing the single non-volatile memory device is necessary. The remainder of the channel controllers can be turned off to reduce the power consumption of the SSD controller 120, and further reduce the overall power required to be supplied by the supercapacitor 130.

In other embodiments, partition A 144 may comprise multiple non-volatile memory devices. In these embodiments, multiple channel controllers of the SSD controller 120 may be necessary to access the non-volatile memory devices. While utilizing multiple non-volatile memory devices and channel controllers will necessarily consume more power than a single non-volatile memory device and a single channel controller, the use of multiple non-volatile memory devices allows for data mirroring of the critical information stored on the volatile memory DRAM buffer 125. In other words, the critical information stored on the volatile memory DRAM buffer 125 may be duplicated on multiple non-volatile memory devices which reduces the likelihood of data corruption of the critical information.

For example, by using two non-volatile memory devices for partition A 144, the critical information stored on the volatile memory DRAM buffer 125 will be duplicated on each of the two non-volatile memory devices. In case one of the copies of the critical information transferred from the volatile memory DRAM buffer 125 to one of the non-volatile memory devices is corrupted, there is a backup copy of the same critical information on the other non-volatile memory device. Correspondingly, the use of even more non-volatile memory devices will further reduce the likelihood of data corruption of the critical information transferred from the volatile memory DRAM buffer 125.

Moreover, the use of multiple channel controllers will also reduce the likelihood of data corruption where a particular channel controller or corresponding channel is responsible for corrupting the data. For example, in one embodiment, partition A 144 may comprise four non-volatile memory devices controlled by two channel controllers (two non-volatile memory devices per channel). In this embodiment, the critical information from the volatile memory DRAM buffer 125 will be replicated four times, by two channel controllers, drastically reducing the likelihood that the critical information from the volatile memory DRAM buffer 125 will be corrupted. In another embodiment, the critical information stored in partition A 144 may be protected using erasure coding, RAID, or other similar data protection techniques.

Ultimately, the amount of data protection used to mitigate data corruption will likely be dictated by the end application of the SSD. Due to the tradeoff between the amount of power required to be supplied by the supercapacitor 130 and the number of non-volatile memory devices comprising partition A 144 (and the corresponding number of channel controllers used to access those non-volatile memory devices), consumer applications where cost reduction or power mitigation during a power loss or failure is one of the considerations, the SSD may not have any data protection and partition A 144 will comprise a single non-volatile memory device accessed by a single channel controller to maximize power savings, thus reducing the required storage capacity and cost of the supercapacitor 130.

On the other hand, for enterprise applications where data integrity is one of the considerations, the SSD may incorporate one or more data protection techniques such as erasure coding, RAID, and other suitable data protection techniques, or any combination thereof, with partition A 144 comprising multiple non-volatile memory devices accessed by multiple channel controllers, which necessarily requires the supercapacitor 130 to be able to provide additional power for the additional non-volatile memory devices of partition A 144 and the channel controllers of the SSD controller 120. Regardless of the end application, because partition A 144 remains a subset of the entire NVMA, significant power savings can be obtained for both consumer and enterprise applications while still retaining the ability to save critical information in the volatile memory DRAM buffer 125 to the non-volatile memory devices of partition A 144.

As an illustrative example of the significance of the power savings realized according to the embodiments of the invention, assume a 4 TB SSD has an NVMA comprising 16 channels with 16 non-volatile memory devices per channel, for a total of 256 non-volatile memory devices. Further assume each non-volatile memory device consumes 80 mA while active (e.g. being used for reads, writes, erasing, caching, data management, etc.) and 10 mA while idle, each active channel consumes 80 mA, and each channel controller consumes 200 mA within the SSD controller. Under normal operation, typically half of the non-volatile memory devices are active. Thus, the amount of power consumed if the entire NVMA was active is:

> 10.24 A (128 active non-volatile memory devices×80 mA per active non-volatile memory device)+
> 1.28 A (128 idle non-volatile memory devices× 10 mA per idle non-volatile memory device)+
> 1.28 A (16 active channels×80 mA per channel)+3.2 A (16 channel controllers×200 mA per channel controller)=16 A Thus, if the entire NVMA were active during a power loss or failure event, the drain on the supercapacitor or other backup power supply would be 16 A.

To illustrate the amount of power savings, in one embodiment of the invention, a dedicated partition of the NVMA that remains powered during a power loss or power failure event comprises a single active non-volatile memory device and a single channel. The remaining 255 non-volatile memory devices and 15 channels are turned off (along with their corresponding channel controllers). The amount of power consumed if only the dedicated partition of the NVMA was powered is:

> 0.08 A (1 active non-volatile memory device×80 mA per active non-volatile memory device)+0.08 A (1 active channel×80 mA per channel)+0.2 A (1 channel controller×200 mA per channel controller)=0.36 A As illustrated in the example calculation above, the amount of power savings for a 4 TB drive during a power loss or failure event with a dedicated partition comprising a single non-volatile memory device and a single channel is approximately 15.64 A, or 97% of the power consumed by the entire NVMA during normal operation. Of course, the amount of power savings may be greater or lower than 97% calculated in the above example depending on the size of the SSD (which may affect the number of non-volatile memory devices and channels/channel controllers), the specific power consumption of the non-volatile memory devices, and the size of the dedicated partition (number of non-volatile memory devices and number of channels/channel controllers) that remains active during the power loss or failure event, among other considerations. It is also understood that in real-world applications, some leakage current or background power may reach the non-volatile memory devices that are turned off, or not intentionally supplied power, which may also impact the amount of power savings that is actually realized.

Regardless, as previously stated, because the dedicated partition that remains powered during a power loss or failure event comprises a subset of the overall NVMA, significant power savings can be realized while still retaining the ability to save critical information in the volatile memory DRAM buffer to the non-volatile memory devices of the dedicated partition. In one embodiment, the dedicated partition during a power loss or failure event consumes less than 20% of the power the entire NVMA consumes during normal operation. The operation of the PLP for the SSD shown and described in FIGS. 1 and 2 is explained in further detail in connection with FIGS. 3-6.

Figure 3:
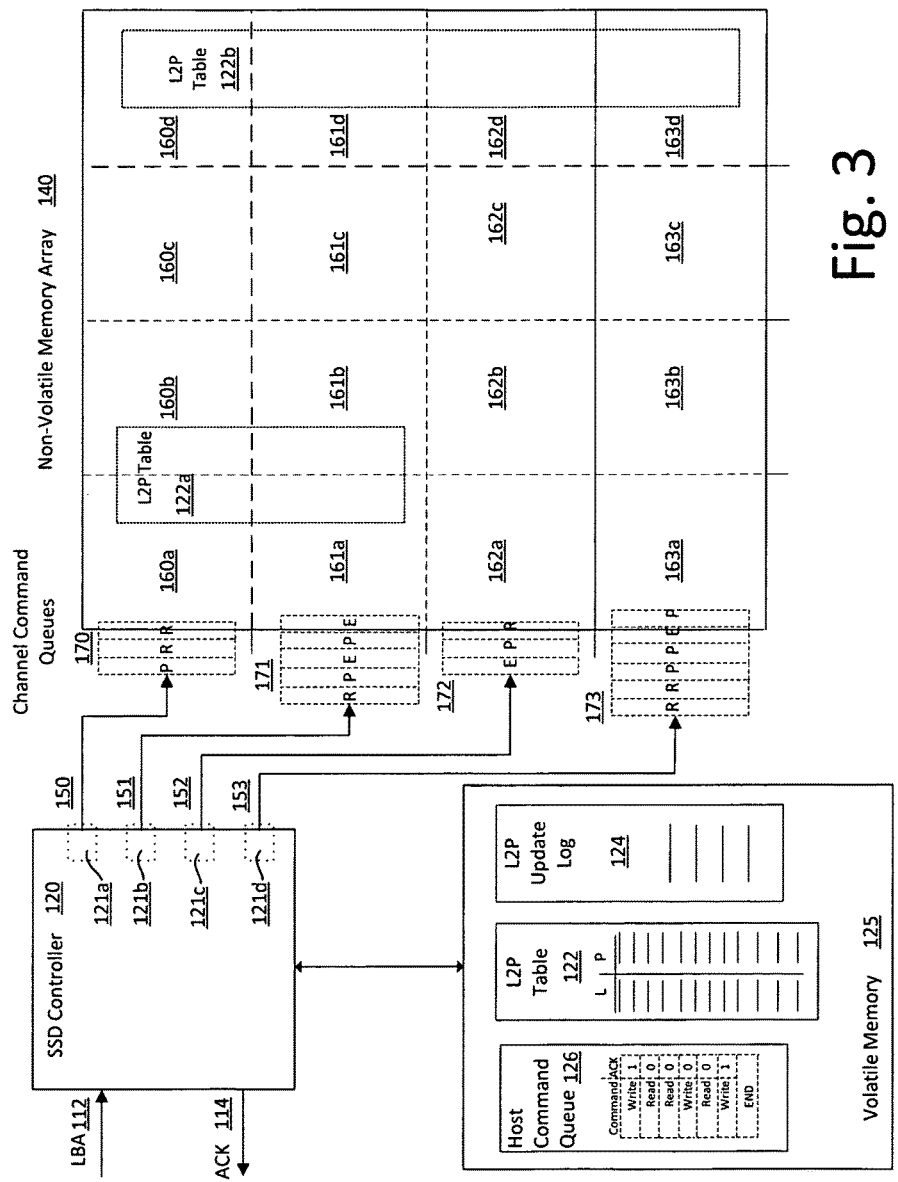
FIG. 3 is a block diagram of the processing of commands and data that occurs in an SSD during normal operation, according to one embodiment of the invention.

FIG. 3 shows a block diagram of the processing of commands and data that occurs in an SSD 100 during normal operation, according to one embodiment of the invention. As shown in FIG. 3, the volatile memory 125 is used for the temporary storage of commands and data as they are being processed by the SSD Controller 120 including a buffer for the incoming commands from the host device (not shown), host command queue 126, and the temporary storage of metadata, which includes a copy of a logical to physical address translation table, or L2P table 122 and a log of updates to be applied to the L2P table, or L2P update log 124. The volatile memory 125 can be any suitable device or devices. In one embodiment, the volatile memory 125 comprises DRAM.

As further shown in FIG. 3, the NVMA 140 is typically an array organized in parallel channels 150-153, and banks of non-volatile memory devices 160*a-d*, 161*a-d*, 162*a-d*, 163*a-d*, which provide the permanent or long-term storage for the data. In one embodiment, non-volatile memory devices 160*a-d*, 161*a-d*, 162*a-d*, 163*a-d* comprise NAND flash memory. When executing the Logic Block Address (LBA) based commands 112 from the host device to the SSD controller 120, the SSD controller 120 returns status information to the host device regarding the status of the processing of the commands through an acknowledgment or ACK 114 signal.

As LBA based commands 112 are received from the host device, the SSD controller 120 temporarily buffers the commands and data in the host command queue 126 in the volatile memory 125. If the command is a read command, the SSD controller 120 must wait until the command has been processed and the data returned to the host device before the ACK 114 signal is provided. If the command is a write command, the SSD controller 120 may issue the ACK 114 signal as soon as the command is stored in the host command queue 126, on the assumption that the command will be processed and the data stored in the NVMA 140. In this case, the data for the write command now becomes critical information in the event of a power failure, as the command has been acknowledged via the ACK 114 signal, but its data in the host command queue 126 in volatile memory 125 has not yet been written to the NVMA 140. Commands and data (read or write) which have not been acknowledged at the time of a power failure need not be treated as critical information, as the host device can perform its own error handling for commands that have been issued but not acknowledged.

Referring back to the normal operation of the SSD, the SSD controller 120 processes the commands in the host command queue 126 and the data is read from and written to the NVMA 140 across multiple memory data channels 150-153. In other embodiments, the NVMA 140 may comprise 8, 16, or more channels. As previously discussed, each channel is controlled independently by channel controllers 121*a-d* within the SSD controller 120, and deals with a corresponding subset of the non-volatile memory devices 160*a-d*, 161*a-d*, 162*a-d*, and 163*a-d* in the NVMA 140. Within each channel controller 121*a-d*, there is a channel command queue 170-173. And, within each channel command queue 170-173, there may be a different mixture of memory commands directed to the corresponding non-volatile memory devices, including read, program (for writing data) and erase commands (denoted by letters R,P and E) because, as previously discussed, each channel 150-153 is operated independently of each other.

The L2P table 122 provides the key as to where data is physically stored in the NVMA 140. The L2P table 122 is a one-to-one relationship table providing a mapping between the logical location of the data block that is understood by the host device, that is the logical block address provided by the LBA based commands 122, and the physical location of the data in the NVMA 140, which may be expressed as the non-volatile memory device or die within the non-volatile memory device and block number and page number and offset within the page.

As shown in FIG. 3, copies of the L2P table 122 are stored in the NVMA 140, where there may be more than one copy. L2P Tables 122a and 122b, which are copies of the L2P table 122, are stored in the NVMA 140 to ensure the availability and integrity of the data contained in a given L2P table (either 122a or 122b) in the event of errors and failures within the NVMA 140. This is especially important as the SSD controller 120 must be able to read the L2P table 122 data without errors every time the SSD starts up. A copy of the L2P table 122 may be stored in volatile memory 125 for fast and convenient access, which will be populated in the first instance when the SSD boots up by copying either L2P table 122a or 122b in the NVMA 140 to the volatile memory 125 as L2P table 122.

The logical to physical addressing also needs to be continually updated as new or updated data is written to the NVMA 140. In order to maintain good write performance of the SSD, the SSD controller 120 does not typically update the L2P tables 122, 122a, and 122b every time new data is written to the NVMA 140 as this would constitute unacceptable overhead and cause the SSD to operate slowly and inefficiently. Instead, the SSD controller 120 maintains the newly entered data in an L2P update log 124. In normal operation when the L2P update log 124 reaches a threshold requirement, which may be based on the amount of memory available to store the L2P update log 124, for example, the number of entries in the L2P update log 124 and/or duration of time since the last L2P update log 124 was saved, the SSD controller 120 will initiate the updating of all the copies of the L2P table 122, 122a, and 122b. The periodic updating of the L2P tables 122, 122a, and 122b with the L2P update log 124, means that at the instant when a power failure occurs, the L2P tables 122a and 122b may be missing the latest updates from the L2P update log 124. The L2P update log 124 therefore also becomes part of the critical information and should be written to the NVMA 140 in the event of a power failure, whereas the L2P table 122 does not because identical copies already exist in L2P tables 122a and 122b in the NVMA 140.

At the time of a power failure, the status of the read, erase, and program commands in the channel command queues 170-173 cannot be readily re-ordered or re-routed to other channels of the NVMA 140. Accordingly, in one embodiment, after a power failure event the commands in the channel command queues 170-173 are not changed or stopped by the SSD controller 120, and the entire NVMA 140 remains powered and active and commands may be queued to any of the non-volatile memory devices 160a-d, 161a-d, 162a-d, 163a-d, and on any channel 150-153.

In another embodiment, all read commands in channel command queues 170-173 need not be processed because the data is simply not read and no data or ACK 114 is returned to the host device, which may later (after having regained power) process the error and take remedial action. Such remedial action may include re-trying the command or returning a read error to the application which caused the command to be issued. In this embodiment, not processing read commands will not produce a detrimental result as the data is already stored in the NVMA 140 and the host device may re-issue any failed read commands in order to successfully read the data when power is regained.

This satisfies the first of the two main power loss operational objectives which are needed to maintain the integrity of the data and metadata and to ensure the data is in a consistent state when stored within the SSD, which are:
1. The completion of any currently executing and queued commands to the non-volatile memory devices of the SSD, and
2. The saving of all metadata updates associated with all data written to the non-volatile memory device.

Figure 4:
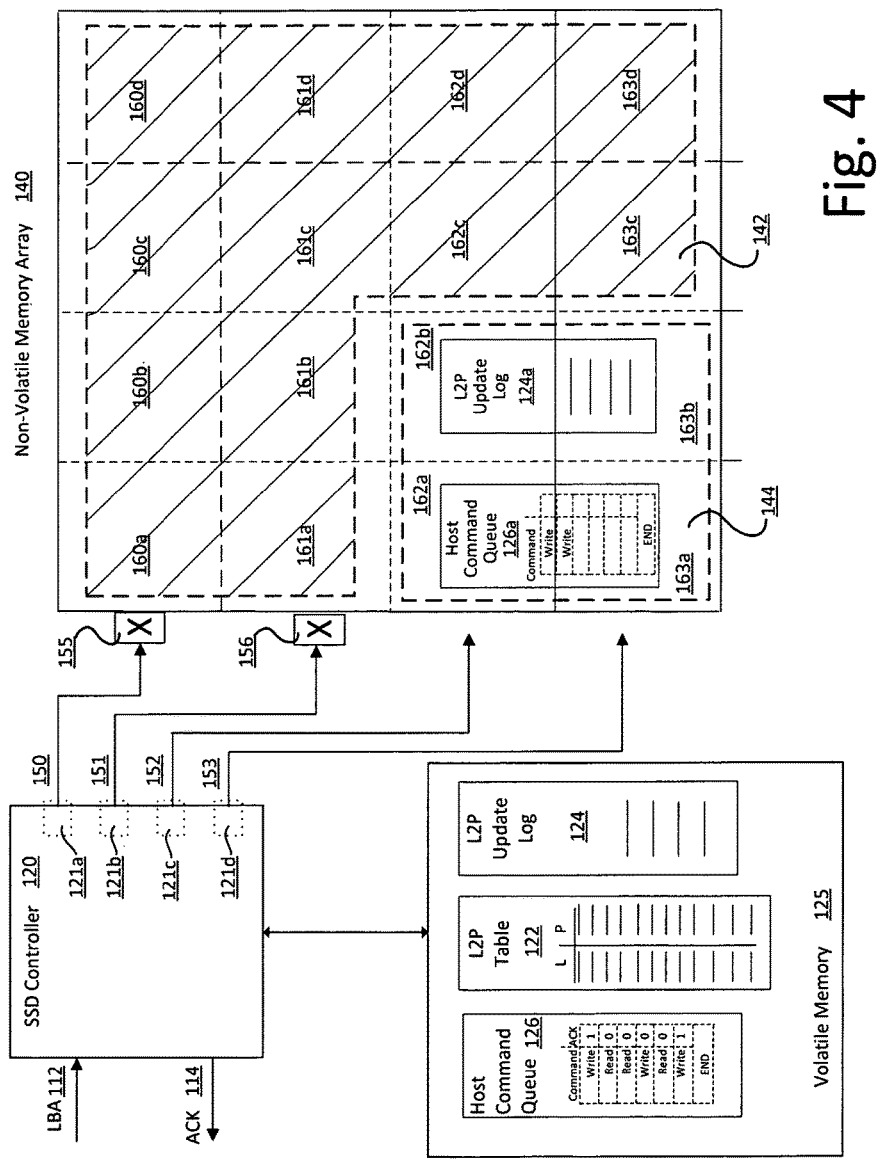
FIG. 4 is a block diagram of the operation of an SSD during a power outage or power loss, according to one embodiment of the invention.

FIG. 4 shows a block diagram of the operation of an SSD during a power outage or power loss, according to one embodiment of the invention. In FIG. 4, the above power loss operational objectives are achieved by first allowing the processing of all commands in channel command queues to be completed by leaving the entire NVMA 140 powered (satisfying the first of the power loss operational objectives as explained above), and then the SSD controller 120 asserts the VregB Disable 134 signal to power off partition B 142 of the NVMA 140 (shown in FIG. 2), but leaves the separately powered dedicated partition A 144 of the NVMA 140 powered on. This considerably reduces the amount of power drawn by the SSD as only the smaller dedicated partition A 144 of the NVMA 140 remains powered. In one embodiment, the powered dedicated partition A 144 stores a copy of the L2P update log 124a. In a further embodiment, the physical devices, dies, blocks and pages to be employed for the location of L2P update log 124a may be predefined in the partition A 144 so there is no requirement for the SSD controller 120 to separately save the locations of the actual physical addresses of the memory used to store the L2P update log 124a in partition A 144, further increasing efficiency and reducing the amount of information to be stored in partition A 144.

As further shown in FIG. 4, after being powered off, the main partition B 142 is not available for storage of data. Also, channels 150 and 151 are blocked from sending further commands as illustrated by the "X" label corresponding to channel command queues 155 and 156. In one embodiment, the channel controllers 121a and 121b of the SSD controller 120 corresponding to channels 150 and 151 are also turned off, reducing the amount of power consumed by the SSD controller 120. Channels 152 and 153 are still available, but the only accessible non-volatile memory devices are 162a, 162b, 163a and 163b in the dedicated partition A 144. As previously discussed, the embodiment shown in FIG. 4 only represents one particular configuration for the dedicated partition A 144, and in other embodiments, the dedicated partition A 144 could be larger or smaller, using multiple channels and non-volatile memory devices, or could be a single non-volatile memory device accessed via a single channel in the NVMA 140.

Additionally, there is a third power loss operational objective for the SSD in the event of a power failure:
3. All write data commands and associated data that have been acknowledged as completed to the host device should be saved to non-volatile memory.

This third operational objective is to ensure that there is no "data loss" apparent to the host device. That is, where data associated with a write command that has been acknowledged is not actually written to non-volatile memory, so when the host later tries to retrieve that data, either the data returned will be old data or the data will be absent and an error is returned.

Referring back to FIG. 4, at the moment of power failure there may be write commands in the host command queue 126 in the volatile memory array for writing and storage. There may also be read commands in the host command queue 126 in the volatile memory 125. After completing all commands in the channel command queues and saving the L2P update log 124*a*, a copy of the host command queue 126 is directly written to partition A 144 as host command queue 126*a* by the SSD controller 120. As with saving of the L2P update log 124*a*, in one embodiment, partition A 144 may be predefined and the SSD controller 120 may select a fixed location for the physical addresses of the non-volatile memory devices used to store the host command queue 126*a* in partition A 144. In one embodiment, the read commands and unacknowledged write data commands in host command queue 126 may be omitted from copying to host command queue 126*a* with no detrimental effect because the acknowledged write commands remain in the host command queue 126*a*, which has been saved to partition A 144. In this manner, each of the three power loss operational objectives for the SSD in the event of a power failure is accomplished.

Figure 5:
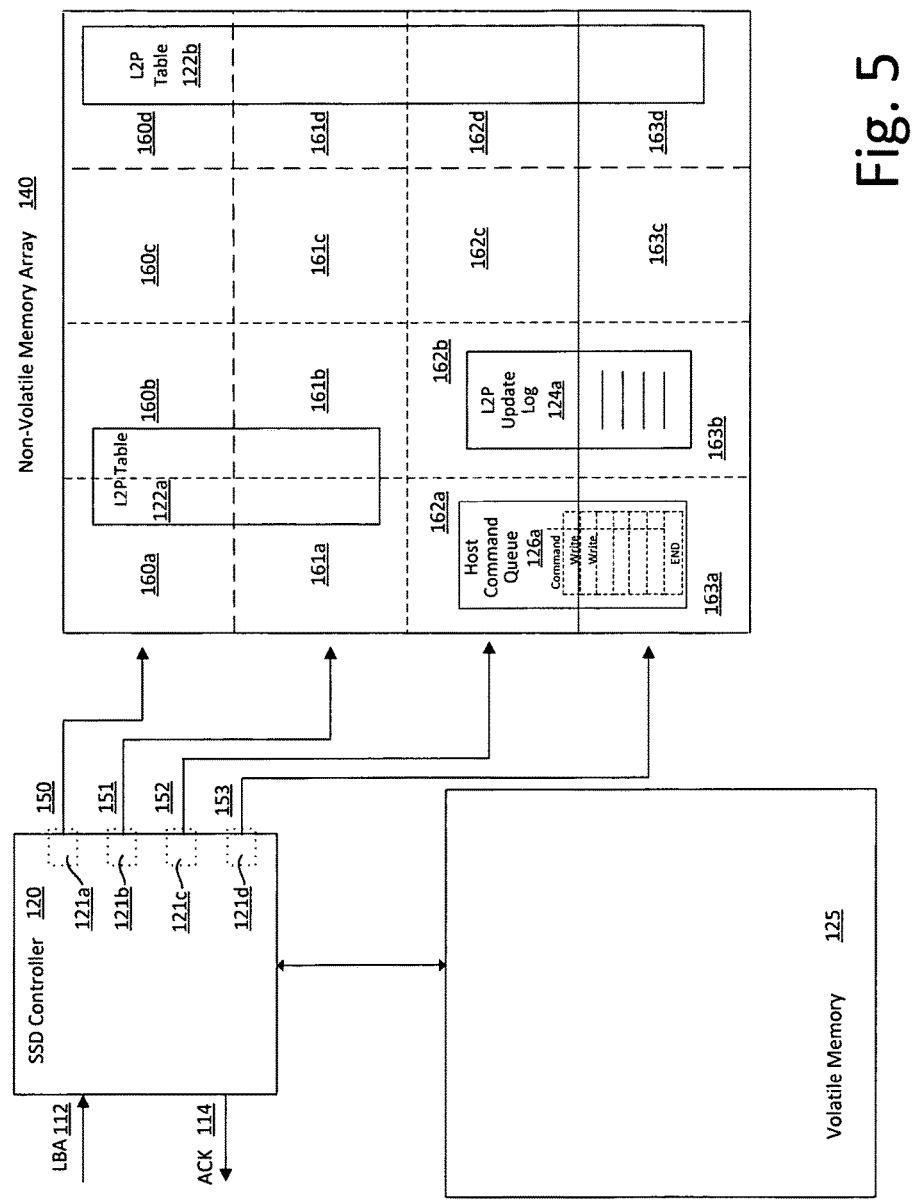
FIG. 5 is a block diagram of the data as stored on an SSD following a power outage or power loss, according to one embodiment of the invention.

FIG. 5 shows a block diagram of the data as stored on an SSD following a power outage or power failure event, according to one embodiment of the invention. As shown in FIG. 5, after the SSD controller 120 completes the handling of the power failure event and the SSD powers down, the data previously stored in volatile memory 125 is lost, and the NVMA 140 contains all of the necessary critical information to restart the SSD. The NVMA 140 contains multiple copies of the L2P table (122*a* and 122*b*), the L2P update log 124*a* and the host command queue 126*a*. As shown in FIG. 5, only the acknowledged write commands (and the associated data waiting to be written) are saved in the host command queue 126*a*, minimizing the amount of data that needs to be saved to the NVMA 140 and improving efficiency. As previously discussed, in other embodiments of the invention, unacknowledged write commands (and the associated data be written) and read commands are also saved in the host command queue 126*a*.

Figure 6:
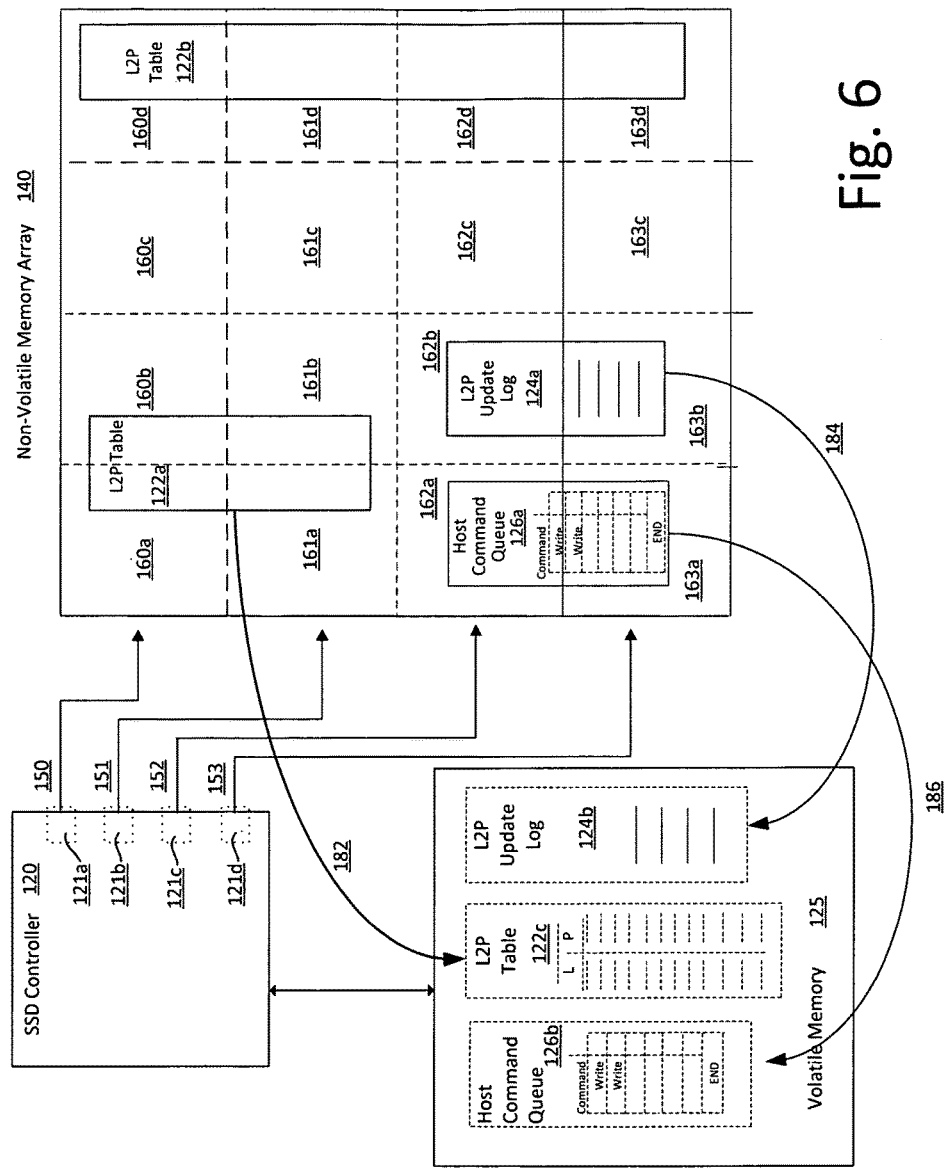
FIG. 6 is a block of the data as restored by an SSD after being powered up following a power outage or power loss, according to one embodiment of the invention.

FIG. 6 shows a block of the data as restored by an SSD after being powered up following a power outage or power loss, according to one embodiment of the invention. As shown in FIG. 6, in one embodiment, upon restarting or repowering the SSD, the SSD controller 120 will first, repopulate 182 the L2P table 122*c* in volatile memory 125 from the L2P tables (122*a* and 122*b*) stored in the NVMA 140; second, restore 184 the L2P update log 124*b* from the copy of the L2P update log 124*a* saved in partition A 144; third, reconstruct 186 the host command queue 126*b* in volatile memory 125 from the copy of the host command queue 126*a* saved in partition A 144. Then normal operations would recommence with SSD controller 120 processing the commands in the host command queue 126, and updating the copies of the L2P tables (122*a*, 122*b*, and 122*c*) from the L2P update log 124*b*.

Figure 7:
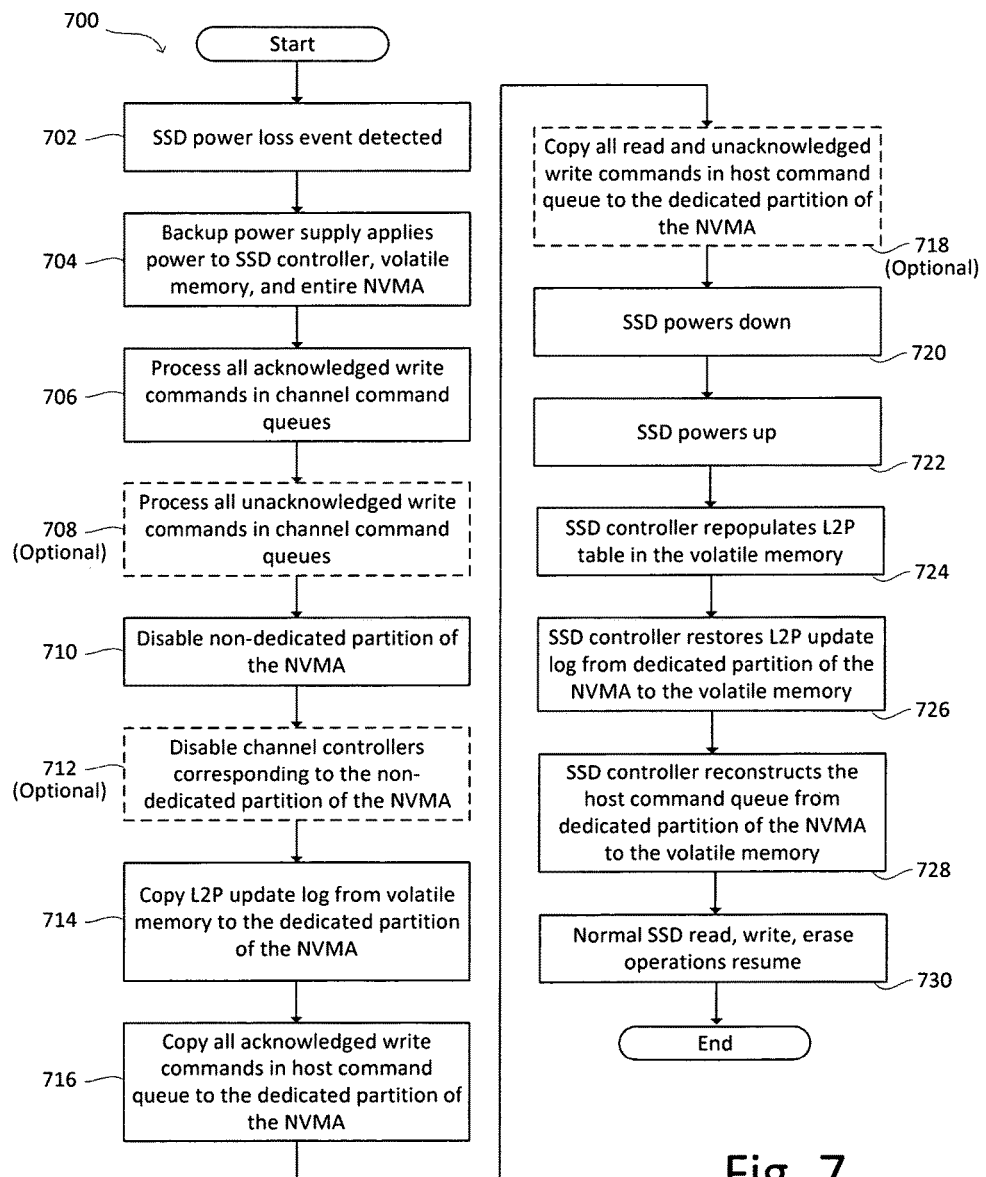
FIG. 7 is a flowchart of method steps for performing PLP for an SSD, according to one embodiment of the invention.

FIG. 7 shows a flowchart of method steps 700 for performing PLP for an SSD, according to one embodiment of the invention. The SSD, comprising an SSD controller, a volatile memory, and an NVMA, is connected to a host device, such as a computer, via a host interface. At step 702, the SSD detects a drop in the power supplied from the host, indicating that the host device has experienced a power loss event. In one embodiment, an alert signal is sent to the SSD controller. At step 704, the SSD switches to a backup power supply to provide power to the SSD controller, volatile memory, and the entire NVMA. The backup power supply may comprise a supercapacitor, a battery, or any other suitable device for providing backup power to the components of the SSD, or any combination thereof.

At step 706, the SSD controller processes all of the acknowledged write commands in the channel command queues. As previously discussed, write commands that have been acknowledged is critical information in the event of a power failure because the command has been acknowledged so the host device, upon reboot, will expect that certain data has been written to the NVMA. Thus, pending acknowledged write commands in the channel command queues should be processed. Optionally, in one embodiment, at step 708, the SSD controller also processes all unacknowledged write commands in the channel command queues as would be done in normal operation. Step 708 is optional because the host device can simply reissue any failed read commands when power is restored to the SSD, and the host will not expect an unacknowledged write command to have been processed. Thus, in one embodiment, step 708 is skipped to reduce the amount of data being processed by the SSD controller to increase efficiency, and the method steps 700 proceeds directly from step 706 to 710.

At step 710, the non-dedicated partition of the NVMA is disabled. In one embodiment, the non-dedicated partition of the NVMA comprises the majority of the non-volatile memory devices. As previously discussed in connection with FIG. 2, the non-dedicated partition of the NVMA may be disabled by switching off the voltage regulator powering the non-dedicated partition (for example, by asserting VregB disable 134 as in FIG. 2). Optionally, in one embodiment, at step 712 the channel controllers within the SSD controller corresponding to the non-dedicated partitions of the NVMA are also disabled. In this embodiment, additional power savings can be realized because the individual channel controllers within the SSD require a substantial amount of the overall power consumed by the SSD controller. Of course, as previously discussed in connection with FIG. 4, the channel controllers corresponding to the dedicated partition of the NVMA will not be disabled. However, disabling the individual channel controllers corresponding to the non-dedicated partition of the NVMA requires additional programming and/or logic for the SSD controller, and so in one embodiment, step 712 is skipped and method steps 700 proceeds directly from step 710 to 714.

At step 714, the L2P update log is copied from the volatile memory to the dedicated partition of the NVMA. In one embodiment, the physical devices, dies, blocks, and pages used to store the L2P update log has been predefined in the dedicated partition. This is done so that the SSD controller does not have to separately save the locations of the actual physical addresses of the L2P update log in the dedicated partition of the NVMA, further increasing efficiency and reducing the amount of information required to be stored in the dedicated partition. At step 716, all acknowledged write commands in the host command queue are copied to the dedicated partition of the NVMA. Optionally, in one embodiment, at step 718 all read and unacknowledged write commands in the host command queue are also copied to the dedicated partition of the NVMA. However, as previously discussed, read and unacknowledged write commands are not critical information that must be saved in the dedicated partition of the NVMA, and can be addressed by the host device after power is regained with no detrimental effect. As such, in one embodiment, step 718 is skipped to reduce the amount of information copied to the dedicated partition of the NVMA and the method steps 700 proceeds directly from step 716 to step 720.

At step 720, after all the critical information has been processed by the SSD controller (i.e. the acknowledged write commands in the channel command queue) or saved to the dedicated partition of the NVMA (i.e. the L2P update log and the acknowledged write commands in the host command queue), the SSD shuts down and the backup power supply is turned off. At step 722, after the host device regains power, the SSD device powers back up. After the SSD powers up, at step 724, the SSD controller repopulates the L2P table in the volatile memory. As previously discussed in connection with FIG. 5, the SSD may store multiple copies of the L2P table throughout the non-dedicated partition of the NVMA (which is also why it is not necessary to save a copy of the L2P table to the dedicated partition), and so after powering back up, the SSD controller can repopulate the volatile memory with any one of the copies of the L2P table from the NVMA.

At step 726, the SSD controller restores the L2P update log from the dedicated partition of the NVMA to the volatile memory. At step 728, the SSD controller reconstructs the host command queue from the dedicated partition of the NVMA to the volatile memory. At step 730, the SSD can resume normal read, write, and erase operations. Implementing the PLP for an SSD by performing the method steps 700 provides a number of improvements over the prior art. In particular, by performing the method steps 700, the SSD consumes substantially less power during a power failure event by only using a subset of the non-volatile memory devices comprising the NVMA to save only the critical information necessary for the SSD to operate after power to the host device is restored. Thus, the method steps 700 results in PLP that is more efficient, reducing the amount of power required to be delivered by the backup power supply and, in turn, reduces the overall cost of the SSD.

Other objects, advantages and embodiments of the various aspects of the present invention will be apparent to those who are skilled in the field of the invention and are within the scope of the description and the accompanying Figures. For example, but without limitation, structural or functional elements might be rearranged, or method steps reordered, consistent with the present invention. Similarly, principles according to the present invention could be applied to other examples, which, even if not specifically described here in detail, would nevertheless be within the scope of the present invention.

What is claimed is:

1. A solid state drive (SSD) comprising:
   an SSD controller comprising one or more memory device controllers;
   a volatile memory in communication with the SSD controller;
   a non-volatile memory in communication with the SSD controller, the non-volatile memory comprising a plurality of non-volatile memory devices arranged in a plurality of partitions, the one or more memory device controllers controlling the plurality of non-volatile memory devices; and
   a power circuit in communication with the SSD controller and configured to supply a first power to the plurality of non-volatile memory devices during a normal operation of the SSD, to supply the first power to active partitions in the event of a power loss or failure of the SSD, and to reduce power-to inactive partitions in the event of the power loss or failure, wherein the active partitions corresponding to less than all of the plurality of partitions of the plurality of non-volatile memory devices, and wherein to reduce power comprises supplying a second power, less than the first power.

2. The SSD of claim 1, wherein reducing power comprises switching off the supply of power to the inactive partitions.

3. The SSD of claim 1, wherein non-volatile memory devices are arranged in an array comprising a plurality of channels, each of the channels comprising one or more of the non-volatile memory devices.

4. The SSD of claim 3, wherein each of the one or more memory device controllers are configured to control a corresponding one or more channels of the array.

5. The SSD of claim 1, wherein the SSD controller is configured to deactivate the one or more memory device controllers controlling certain of the plurality of non-volatile memory devices that are not supplied power by the power circuit in the event of the power loss or failure.

6. The SSD of claim 1, wherein the power circuit comprises:
   a plurality of voltage regulators connected to the plurality of partitions of the plurality of non-volatile memory devices, each of the plurality of voltage regulators configured to supply power to a corresponding one or more partitions of the plurality of partitions; and
   a switch connected to the plurality of voltage regulators and configured to supply power to each of the plurality of voltage regulators from a first power source during normal operation and from a second power source in the event of the power loss or failure.

7. The SSD of claim 6, wherein the power circuit is configured to transmit a first signal to the SSD controller in the event of the power loss or failure and deactivate one or more voltage regulators of the plurality of voltage regulators.

8. The SSD of claim 6, wherein the first power source comprises a host device.

9. The SSD of claim 6, wherein the second power supply comprises a capacitor or a battery.

10. The SSD of claim 7, wherein the power circuit is configured to deactivate one or more voltage regulators of the plurality of voltage regulators in response to a second signal from the SSD controller.

11. The SSD of claim 1, wherein the SSD controller is configured to identify critical information from volatile memory in the event of the power loss or failure.

12. The SSD of claim 11, wherein the SSD controller is configured to cause the transfer of the critical information to the active partitions in the event of the power loss or failure.

13. The SSD of claim 11, wherein the critical information comprises a logical to physical address update log.

14. The SSD of claim 11, wherein the critical information comprises acknowledged write commands.

15. The SSD of claim 1, wherein the active partitions in the event of the power loss or failure consume less than 20% of a power consumed by the non-volatile memory during normal operation.

16. The SSD of claim 1, wherein the power circuit is further configured to supply a first power to the active partitions in the event of a power loss or failure of the SSD and to the plurality of non-volatile memory devices during the normal operation of the SSD, and to supply a second power, less than the first power, to the inactive partitions in the event of the power loss or failure.

17. A method of power loss protection (PLP) for a solid state drive (SSD), the method comprising:

supplying a first power to a non-volatile memory during a normal operation of the SSD, the non-volatile memory comprising a plurality of non-volatile memory devices arranged in a plurality of partitions, the plurality of non-volatile memory devices being controlled by one or more memory device controllers of an SSD controller;

supplying the first power to active partitions in the event of a power loss or failure of the SSD, the active partitions corresponding to less than all of the plurality of partitions of the plurality of non-volatile memory devices; and reducing power to inactive partitions in the event of the power loss or failure by supplying a second power, less than the first power.

18. The method of claim 17, wherein reducing power comprises switching off the power to the inactive partitions.

19. The method of claim 17, further comprising:
providing the non-volatile memory devices arranged in an array comprising a plurality of channels, each of the channels comprising one or more of the non-volatile memory devices.

20. The method of claim 19, further comprising:
controlling a corresponding one or more channels of the array with each of the one or more memory device controllers.

21. The method of claim 17, further comprising:
deactivating the one or more memory device controllers controlling certain of the plurality of non-volatile memory devices that are not supplied power in the event of the power loss or failure.

22. The method of claim 17, further comprising:
supplying power to the plurality of partitions of the plurality of non-volatile memory devices from a power circuit comprising a plurality of voltage regulators, each of the plurality of voltage regulators supplying power to a corresponding one or more partitions of the plurality of partitions;
supplying power to the plurality of voltage regulators from a first power source during normal operation; and
supplying power to the plurality of voltage regulators from a second power source in the event of the power loss or failure.

23. The method of claim 22, further comprising:
transmitting a first signal from the power circuit to the SSD controller in the event of the power loss or failure; and
deactivating one or more voltage regulators of the plurality of voltage regulators in the event of the power loss or failure.

24. The method of claim 22, wherein the first power source comprises a host device.

25. The method of claim 22, wherein the second power source comprises a capacitor or a battery.

26. The method of claim 23, further comprising:
transmitting a second signal from the SSD controller to the power circuit; and
deactivating one or more voltage regulators of the plurality of voltage regulators in response to the second signal.

27. The method of claim 17, further comprising:
identifying critical information in a volatile memory in the event of the power loss or failure.

28. The method of claim 27, further comprising:
transferring the critical information to the active partitions in the event of the power loss or failure.

29. The method of claim 27, wherein the critical information comprises a logical to physical address update log.

30. The method of claim 27, wherein the critical information comprises acknowledged write commands.

31. The method of claim 17, wherein in the event of the power loss or failure consuming less than 20% of a power consumed by the non-volatile memory during normal operation.

32. The method of claim 17, wherein,
supplying power to the non-volatile memory during a normal operation of the SSD and supplying power to active partitions in the event of a power loss or failure of the SSD is supplying a first power, and
reducing power to the inactive partitions in the event of the power loss or failure is supplying a second power, less than the first power.

* * * * *